United States Patent
Higgins et al.

(10) Patent No.: US 10,608,968 B2
(45) Date of Patent: Mar. 31, 2020

(54) IDENTIFYING DIFFERENT CHAT TOPICS IN A COMMUNICATION CHANNEL USING COGNITIVE DATA SCIENCE

(71) Applicant: International Business Machines Corporation, Armonk, NY (US)

(72) Inventors: ChunHui Y. Higgins, Durham, NC (US); William P. Higgins, Durham, NC (US); Alexander Sobran, Chapel Hill, NC (US); Pu Yang, Cary, NC (US); Bo Zhang, Cary, NC (US); Ke Zhu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 15/828,794

(22) Filed: Dec. 1, 2017

(65) Prior Publication Data

US 2019/0173812 A1 Jun. 6, 2019

(51) Int. Cl.
*G06F 15/16* (2006.01)
*H04L 12/58* (2006.01)
(Continued)

(52) U.S. Cl.
CPC .......... *H04L 51/04* (2013.01); *G06F 17/2785* (2013.01); *G06N 5/02* (2013.01);
(Continued)

(58) Field of Classification Search
CPC ....... H04L 51/04; H04L 67/306; H04L 51/16; H04L 51/32; H04L 67/10; G06N 5/02; G06F 17/2785; G06Q 10/107
(Continued)

(56) References Cited

U.S. PATENT DOCUMENTS 10,003,560 B1 * 6/2018 Perkins ................... H04L 51/32
2003/0131055 A1 * 7/2003 Yashchin ............. G06Q 10/107
709/204

(Continued)

OTHER PUBLICATIONS

"Threading messaging comes to Slack", https://slackhq.com/threaded-messaging-comes-to-slack-417ffba054bd, Downloaded from internet on Aug. 8, 2017, 7 pages.

(Continued)

*Primary Examiner* — Liang Che A Wang
*Assistant Examiner* — Johnny B Aguiar
(74) *Attorney, Agent, or Firm* — Stephen R. Tkacs; Stephen J. Walder, Jr.; Alexander G. Jochym (57) ABSTRACT

A mechanism is provided in a data processing system to implement a chat topic identification system for identifying chat topics in a multi-user messaging platform. The chat topic identification system receives a plurality of chat messages submitted to a communication channel in the multi-user messaging platform, performs cognitive content language analysis, cognitive personality analysis, cognitive tone analysis, social data analysis, and conversation feature analysis. The chat topic identification system stores results in a user profile associated with the user to form a user profile. A new conversation prediction engine determines a conversation separation score representing a likelihood that a new conversation is being started in the communication channel. A new conversation separation recommendation engine generates a conversation separation recommendation based on the conversation separation score.

15 Claims, 3 Drawing Sheets

(51) Int. Cl.
  *H04L 29/08* (2006.01)
  *G06N 5/02* (2006.01)
  *G06F 17/27* (2006.01)
  *G06Q 10/10* (2012.01)

(52) U.S. Cl.
  CPC ............ *H04L 67/10* (2013.01); *H04L 67/306* (2013.01); *G06Q 10/107* (2013.01); *H04L 51/16* (2013.01); *H04L 51/32* (2013.01)

(58) Field of Classification Search
  USPC .................................................. 709/204, 206
  See application file for complete search history.

(56) References Cited

U.S. PATENT DOCUMENTS

| | | | |
|---|---|---|---|
| 2005/0262199 A1 | 11/2005 | Chen et al. | |
| 2008/0104183 A1* | 5/2008 | Eldering | G06Q 10/107 709/206 |
| 2014/0236953 A1* | 8/2014 | Rapaport | G06Q 10/10 707/740 |
| 2016/0170968 A1 | 6/2016 | Allen et al. | |
| 2016/0196561 A1* | 7/2016 | Iyer | G06Q 30/016 705/304 |
| 2016/0283577 A1 | 9/2016 | Smith et al. | |
| 2016/0364368 A1 | 12/2016 | Chen et al. | |
| 2017/0032021 A1* | 2/2017 | Watanachote | H04L 51/32 |
| 2017/0034226 A1 | 2/2017 | Bostick et al. | |
| 2018/0048604 A1* | 2/2018 | Mikhailov | H04L 51/16 |

OTHER PUBLICATIONS

Anonymously, "SRS Creation Including Gap Identification from Conversations", IP.com No. IPCOM000234677D, Jan. 28, 2014, 5 pages.

Chang, Leland, "Cognitive Data-Centric Systems", GLSVLSI '17, Banff, AB, Canada, May 10-12, 2017, 1 page.

Heuback, Jessica, "Suspect Interrogation: Communication Strategies and Key Personality", Thesis for Bachelor of Science in Communication Studies, Kansas State University; Dec. 2009, 42 pages.

IBM, "Personalized Chatbot Service", ip.com No. IPCOM000181584D, Apr. 6, 2009, 7 pages.

Lynch, John et al., "Conversation Room Topic Adherence", IP.com No. IPCOM000242967D, Sep. 3, 2015, 6 pages.

* cited by examiner

IDENTIFYING DIFFERENT CHAT TOPICS IN A COMMUNICATION CHANNEL USING COGNITIVE DATA SCIENCE

BACKGROUND

The present application relates generally to an improved data processing apparatus and method and more specifically to mechanisms for identifying different chat topics in a communication channel or chatroom using cognitive data science.

Online chat may refer to any kind of communication over the Internet that offers a real-time transmission of text messages from sender to receiver. Chat messages are generally short in order to enable other participants to respond quickly. Thereby, a feeling similar to a spoken conversation is created, which distinguishes chatting from other text-based online communication forms such as Internet forums and email. Online chat may address point-to-point communications as well as multicast communications from one sender to many receivers and voice and video chat, or may be a feature of a web conferencing service. Online chat in a less stringent definition may be primarily any direct text-based or video-based, one-on-one chat or one-to-many or many-to-many group chat (also known as chat room or channel), using tools such as instant messengers, Internet Relay Chat (IRC), talkers, and possibly multi-user dungeons (MUDs).

The term chat room, or chatroom, is primarily used to describe any form of synchronous conferencing, occasionally even asynchronous conferencing. The term can thus mean any technology ranging from real-time online chat and online interaction with strangers (e.g., online forums) to fully immersive graphical social environments. The primary use of a chat room is to share information via text with a group of other users. Generally speaking, the ability to converse with multiple people in the same conversation differentiates chat rooms from instant messaging programs, which are more typically designed for one-to-one communication. The users in a particular chat room are generally connected via a shared internet or other similar connection, and chat rooms exist catering for a wide range of subjects.

Collaborative software or groupware is application software designed to help people involved in a common task to achieve their goals. In terms of the level of interaction it allows, collaborative software may be divided into: real-time collaborative editing (RTCE) platforms that allow multiple users to engage in live, simultaneous, and reversible editing of a single file (usually a document), and version control (also known as revision control and source control) platforms, which allow separate users to make parallel edits to a file, while preserving every saved edit by every user as multiple files that are variants of the original file. Collaborative software is a broad concept that overlaps considerably with computer-supported cooperative work (CSCW). Software products such as email, calendaring, text chat, wiki, and bookmarking belong to this category whenever used for group work, whereas the more general term social software applies to systems used outside the workplace. The use of collaborative software in the work space creates a collaborative working environment (CWE).

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions which are executed by the at least one processor and configure the processor to implement a chat topic identification system for identifying chat topics in a multi-user messaging platform. The method comprises receiving, by the chat topic identification system, a plurality of chat messages submitted to a communication channel in the multi-user messaging platform. The method further comprises performing, by a cognitive content language analysis component executing within the chat topic identification system, cognitive content language analysis on at least one given chat message to determine relevance among words, to identify separate topic indicator words, and to build topic domains likely to be relevant to participants of the communication channel. The method further comprises performing, by a cognitive personality analysis component executing within the chat topic identification system, cognitive personality analysis on the at least one given chat message to determine a personality type associated with the at least one given chat message. The method further comprises performing, by a cognitive tone analysis component executing within the chat topic identification system, cognitive tone analysis on the at least one given chat message to determine a tone category associated with the at least one given chat message. The method further comprises performing, by a social data analysis component executing within the chat topic identification system, social data analysis to enhance a user profile associated with the at least one given chat message. The method further comprises performing, by a conversation feature analysis component executing within the chat topic identification system, conversation feature analysis to determine conversation features associated with the at least one given chat message. The method further comprises storing, by the chat topic identification system, results of the cognitive content language analysis, the cognitive personality analysis, the cognitive tone analysis, and the social data analysis in a user profile associated with the user to form an updated user profile. The method further comprises determining, by a new conversation prediction engine executing within the chat topic identification system, a conversation separation score representing likelihood that a new conversation is being started in the communication channel. The conversation separation score is generated based on analysis of the updated user profile containing previous cognitive analysis results from cognitive content language analysis, the cognitive personality analysis, the cognitive tone analysis, and the social data analysis. The method further comprises generating, by a new conversation separation recommendation engine executing within the chat topic identification system, a conversation separation recommendation based on the conversation separation score and results of the cognitive content language analysis, the cognitive personality analysis, the cognitive tone analysis, the social data analysis, and the conversation feature analysis.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Although modern cloud-based team collaboration tools are meant for organizational communication, such tools are slowly turning into communication platforms, a function for which users had previously used message boards or social media. Many of these communities are categorized by topics that a group of people may be interested in discussing. However, within a communication channel or chat room where people have interest, there are often multiple conversations going on at the same time.

The illustrative embodiments provide a mechanism for cognitively separating conversation topics/threads in one communication channel using multiple layer data science processes and various data science methods. Data science is an interdisciplinary field about scientific methods, processes, and systems to extract knowledge or insights from data in various forms, structured or unstructured, similar to data mining. Data science unifies statistics, data analysis, and related methods in order to analyze actual phenomena with data. Data science employs techniques and theories drawn from many fields within the broad areas of mathematics, statistics, information science, and computer science, in particular from the subdomains of machine learning, classification, cluster analysis, data mining, databases, and visualization.

In a first step, the mechanism performs feature collection as follows:

1. Cognitive content language analysis to get relevance scores among words, to identify separate topic indicator words, and to build topic domains that include all of the words that users responded to in a user profile.

2. Cognitive personality analysis to assign a score of likelihood to start a new conversation thread based on a user's personality features.

3. Cognitive tone analysis to assign a score of likelihood to start a new conversation thread based on a tone category of a user's language.

4. Social data analysis to leverage other social networks to build a more accurate user profile.

5. Conversation feature analysis to determine relationships of users, historical time period, time of the chat, and other system information.

The mechanism performs cognitive function speech to text if voice message are being used in the communication channel. The mechanism repeats the feature collection above for language and content analysis and personality analysis.

In a second step, the mechanism performs new conversation prediction. The mechanism uses all of the above features as inputs for data science classification algorithms to predict the final likelihood of a new conversation thread.

In a third step, the mechanism provides new conversation separation recommendations. Based on the final new conversation result based on the above steps, the mechanism recommends a separation of the new conversation. The mechanism may display the separated conversation in a separate communication channel or color code the conversation threads, for example. The mechanism pulls all of the engaged participants as well as the relevant conversation messages into a new conversation thread.

As one example, a multi-user platform may be the Slack platform. Slack is a cloud-based set of team collaboration tools and services, founded by Stewart Butterfield. The name is an acronym for "Searchable Log of All Conversation and Knowledge." SLACK is a registered trademark of Slack Technologies, Inc. A first Slack channel for communication regarding a main topic may be established for a group of thirty users. At a particular point in time, there may be twenty different users who have collectively posted several hundred messages that relate to different aspects of the main topic. Three of the twenty users may have exchanged six messages regarding a particular aspect or subtopic of the main topic. According to various embodiments, a second Slack channel may be automatically recommended for the subtopic being discussed by the three users. When the recommendation is accepted by one of the users, the messages initiated by each of the three users are reproduced in or copied over into the second Slack channel. The second channel allows the three users to see their subtopic conversation without the clutter of the hundreds of messages in the first Slack channel. By automatically recommending and creating a second Slack channel for the subtopic, the performance of the computer system(s) hosting the Slack platform is improved.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
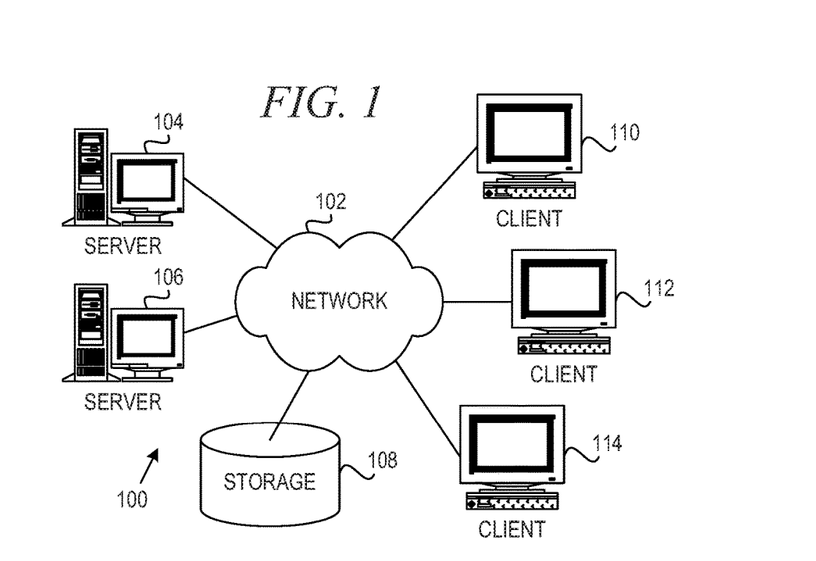
FIG. 1 is an example diagram of a distributed data processing system in which aspects of the illustrative embodiments may be implemented.
Figure 2:
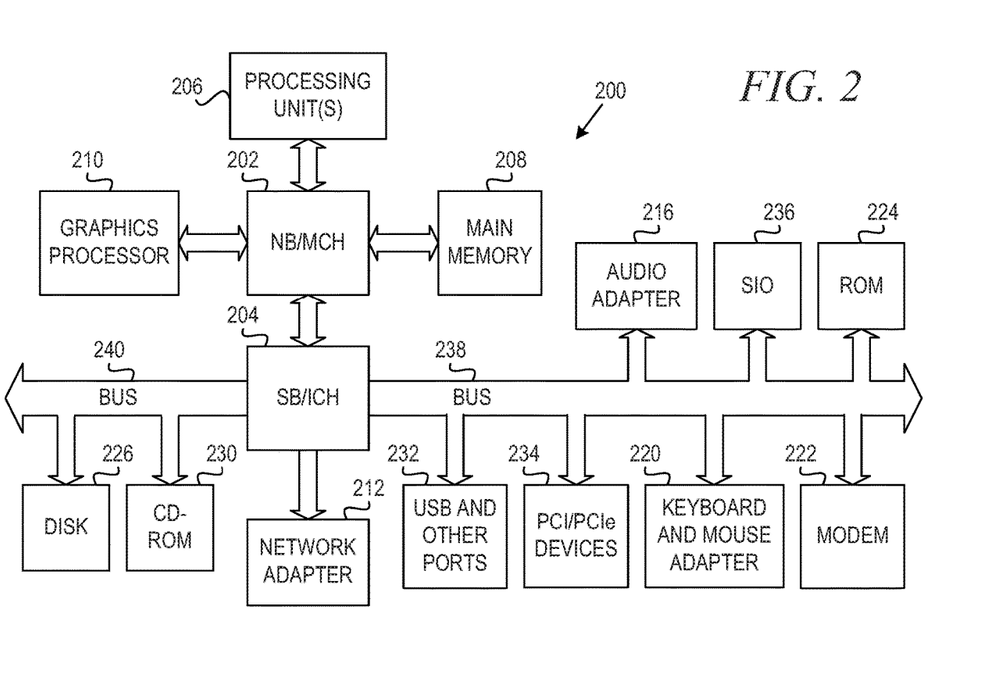
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for identifying different chat topics in a communication channel or chatroom using cognitive data science. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates identifying different chat topics in a communication channel.

As noted above, the mechanisms of the illustrative embodiments utilize specifically configured computing devices, or data processing systems, to perform the operations for identifying different chat topics in a communication channel. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanism for identifying different chat topics in a communication channel.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
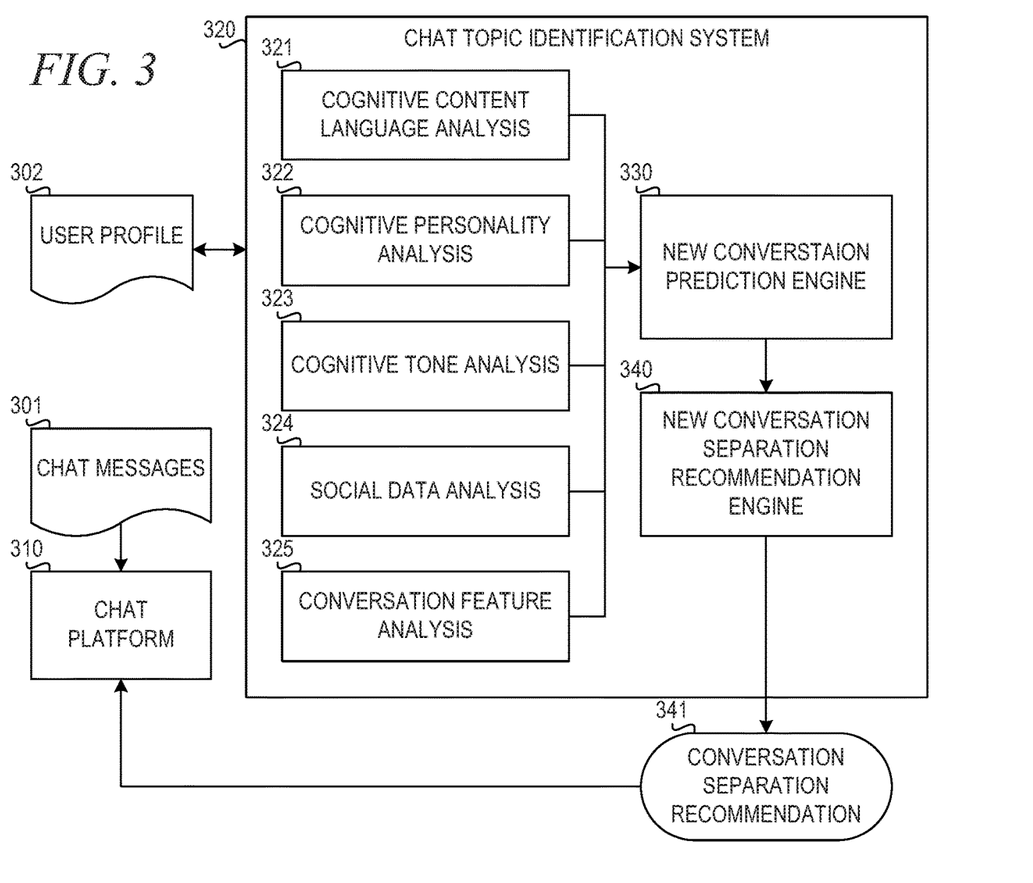
FIG. 3 is a block diagram illustrating a mechanism for identifying different chat topics in a communication channel in accordance with an illustrative embodiment.

FIG. 3 is a block diagram illustrating a mechanism for identifying different chat topics in a communication channel in accordance with an illustrative embodiment. Chat platform 310 receives chat messages 301. Chat platform 310 provides access to the chat messages 301 to chat topic identification system 320, which includes cognitive content language analysis component 321, cognitive personality analysis component 322, cognitive tone analysis component 323, social data analysis component 324, and conversation feature analysis component 325.

Cognitive content language analysis component 321 determines relevance scores among words, identifies separate topic indicator words, and builds a topic domain that includes all of the words users responded to in the user profile. Separate topic indicator words may include, for example, the following: "by the way," "another topic," "PS," etc. Cognitive content language analysis component 321 uses a natural language classifier trained with historical data to determine what keywords or phrases might trigger new conversation threads. Each keyword gets a score of likelihood of starting a new conversation thread. One cognitive method is to associate communication channel members with specific words. Thus, cognitive content language analysis component 321 may look at historical chat logs and use the distance between an occurrence of a non-stopword and a user's response. Users with knowledge germane to the topic (word) will be on average closer to that word during conversations. Then, in real time when that user responds to the word, cognitive content language analysis component 321 can use this inference to separate that part of the conversation from other conversations. Cognitive content language analysis component 321 uses natural language processing (NLP) methods for text analysis to get the relevance between words.

Cognitive personality analysis component 322 determines a personality type for each user in the communication channel. For example, cognitive personality analysis component 322 may determine a personality type of "impatient" for a given user. Cognitive personality analysis component 322 may then determines a score representing the likelihood that the personality type will start a new conversation thread.

Cognitive tone analysis component 323 determines a tone category for each user in the communication channel. For example, cognitive tone analysis component 323 may determine a tone of a given message in the communication channel is "frustrated." Cognitive tone analysis component 323 may then determine a score representing the likelihood that a message of that tone category will lead to a new conversation thread being started.

Social data analysis component 324 enhances each user profile with a similarity score. That is, the social analysis can provide the user relationship with other users in the same communication channel. Also, the social data can be analyzed by other cognitive functions, such as sentiment analysis and personality analysis, to predict the likelihood of starting a new conversation. Social data analysis component 324 leverages other social networks to build a more accurate user profile. Social data analysis component 324 may determine connections in other social networks, reposting of other messages on other social networks, and the like.

Conversation feature analysis component 325 determines other conversation features relevant to predicting whether a new conversation is being started. Conversation feature analysis component 325 may determine the historical time period being discussed, the time of the chat, and the target of messages. In modern communication channels, @user is typically used to target a specific user that you want to talk to directly. So in the historical chat data, a user might have targeted another user to chat via @user, this information can be stored in the user profile and then used for new chat prediction.

Chat topic identification system 320 may also perform cognitive speech to text if voice messages are being used in the communication channel. Chat topic identification system 320 may then pass the resulting text through one or more of components 321-325 for language and content analysis and personality analysis.

Chat topic identification system 320 stores results of cognitive content language analysis 321, cognitive personality analysis 322, cognitive tone analysis 323, social data analysis 324, and conversation feature analysis 325 in user profile 302. Chat topic identification system 320 builds a user profile 302, which is to be used as an input for new conversation prediction.

Chat topic identification system 320 also includes new conversation prediction engine 330, which uses features from components 321-325 as inputs for data science classification algorithms to predict the final likelihood of a new conversation thread. In other words, new conversation prediction engine 330 receives as input content language features, personality analysis features, tone analysis features, social data features, and other conversation features from user profile 302 and generates a prediction score representing the likelihood that a new conversation is being started based on those features.

One cognitive method is to associate communication channel participants with specific words. New conversation prediction engine 330 may examine historical chat logs and use the distance between an occurrence of a non-stopword and a user's response. Users with knowledge germane to the topic (word) will be on average closer to that word during conversations. Then in real time when that user responds to the word, new conversation prediction engine 330 uses this inference to separate that part of the conversation from other conversations.

For topic modeling, the mechanism may use a Latent Dirichlet Allocation (LDA) algorithm, which uses semantic features to cluster topics. The LDA algorithm takes a group of documents and returns a number of topics, which are made up of a number of words, most relevant to these documents. In natural language processing, LDA is a generative model that allows sets of observations to be explained by unobserved groups that explain why some parts of the data are similar. For example, if observations are words collected into documents, it posits that each document is a mixture of a small number of topics and that each word's creation is attributable to one of the document's topics. In a communication channel, each message may be viewed as a document having one or more topics.

Chat topic identification system 320 also includes new conversation separation recommendation engine 340. Based on the final new conversation result from components 321-325 and new conversation prediction engine 330, new conversation separation recommendation engine 340 will generate conversation separation recommendation 341 recommending a separation of a new conversation. Conversation separation recommendation 341 may recommend displaying a new conversation in a separate communication channel or color coding the conversation threads, for example. Conversation separation recommendation 341 may also recommend pulling all of the engaged participants as well as the relevant conversation messages into a new conversation thread.

New conversation separation recommendation engine 340 sends conversation separation recommendation 341 to chat platform 310. A user of chat platform 310 may then act on conversation separation recommendation 341 to separate the engaged participants and relevant conversation messages into a new conversation thread. As discussed above, chat platform 310 may then create a new communication channel for the new conversation thread. The new communication channel may be prepopulated with the relevant conversation messages and the engaged participants. Alternatively, chat platform 310 may color code the separate conversation threads within the same communication channel based on conversation separation recommendation 341.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
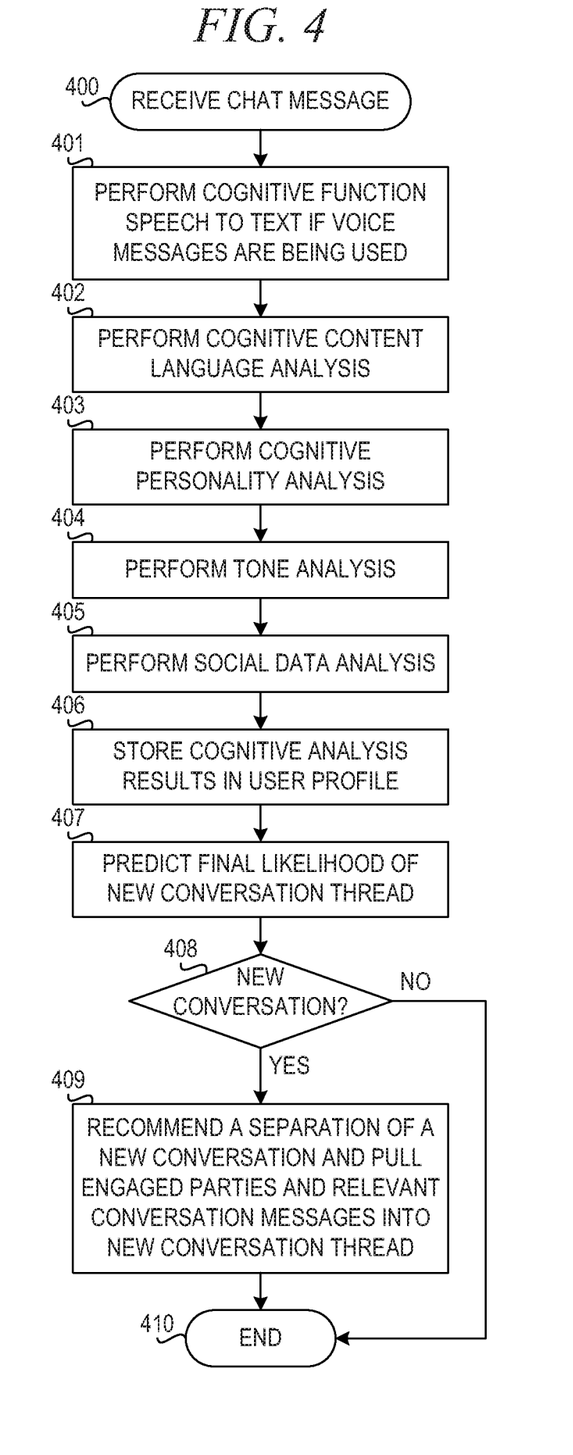
FIG. 4 is a flowchart illustrating operation of a mechanism for identifying different chat topics in a communication channel using cognitive data science methods in accordance with an illustrative embodiment.

FIG. 4 is a flowchart illustrating operation of a mechanism for identifying different chat topics in a communication channel using cognitive data science methods in accordance with an illustrative embodiment. Operation begins when a chat message is received in a communication channel (block 400). The mechanism performs cognitive function speech to text if voice messages are being used (block 401).

The mechanism performs cognitive content language analysis on the chat message to determine a relevance score among words in the chat, to identify separate topic indicator words, and to build a topic domain (block 402). The mechanism performs cognitive personality analysis to determine a personality type associated with the chat message (block 403). The mechanism then performs tone analysis to determine a tone category associated with the chat message (block 404). The mechanism performs social data analysis (block 405). Then, the mechanism stores results of the cognitive content language analysis, the cognitive personality analysis, the tone analysis, and the social data analysis in a user profile (block 406).

The mechanism then predicts a final likelihood that a new conversation is being started based on the contents of the cognitive analysis stored in the user profile (block 407). The mechanism then determines whether the final likelihood indicates that a new conversation is being started (block 408). The mechanism may determine whether the likelihood that a new conversation is being started is greater than a predetermined threshold. If the final likelihood indicates that a new conversation is being started, then the mechanism recommends a separation of the new conversation and pulls engaged participants and relevant conversation messages into the new conversation thread (block 409). Thereafter, operation ends for the current chat message (block 410). If the final likelihood does not indicate that a new conversation is being started in block 408, then operation ends (block 410). Operation then repeats for each subsequent chat message in the chat channel.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the at least one processor to implement a chat topic identification system for identifying chat topics in a multi-user messaging platform, the method comprising:

receiving, by the chat topic identification system, a plurality of chat messages submitted to a communication channel in the multi-user messaging platform;

performing, by a cognitive content language analysis component executing within the chat topic identification system, cognitive content language analysis on at least one given chat message of the plurality of chat messages to determine relevance among words, to identify separate topic indicator words, and to build topic domains likely to be relevant to participants of the communication channel, wherein the cognitive language analysis component uses a natural language classifier trained with historical data to determine keywords or phrases that trigger new conversation threads, wherein each keyword or phrase has an associated first score representing a likelihood the keyword or the phrase will lead to a new conversation thread being started;

performing, by a cognitive personality analysis component executing within the chat topic identification system, cognitive personality analysis on the at least one given chat message to determine a personality type for a given participant associated with the at least one given chat message;

performing, by a cognitive tone analysis component executing within the chat topic identification system, cognitive tone analysis on the at least one given chat message to determine a tone category for the given participant associated with the at least one given chat message;

performing, by a social data analysis component executing within the chat topic identification system, social data analysis on other messages on at least one social network to enhance a user profile associated with the given participant;

storing, by the chat topic identification system, results of the cognitive content language analysis, the cognitive personality analysis, the cognitive tone analysis, and the social data analysis in the user profile associated with the user to form an updated user profile;

determining, by a new conversation prediction engine executing within the chat topic identification system, a conversation separation score representing a likelihood that a new conversation is being started in the communication channel, wherein the conversation separation score is generated based on analysis of the updated user profile containing previous cognitive analysis results from the cognitive content language analysis, the cognitive personality analysis, the cognitive tone analysis, and the social data analysis;

generating, by a new conversation separation recommendation engine executing within the chat topic identification system, a conversation separation recommendation based on the conversation separation score and results of the cognitive content language analysis, the cognitive personality analysis, the cognitive tone analysis, the social data analysis, and conversation feature analysis, wherein the conversation separation recommendation identifies a plurality of engaged participants within the communication channel and relevant messages within the plurality of chat messages;

sending, by the chat topic identification system, the conversation separation recommendation to the multi-user messaging platform;

creating, by the multi-user messaging platform, a new communication channel for the new conversation thread; and prepopulating the new communication channel with the plurality of engaged participants and the relevant messages.

2. The method of claim 1, further comprising determining, by the cognitive personality analysis component, a score representing a likelihood that the given participant of the determined personality type will start a new conversation.

3. The method of claim 1, further comprising determining, by the cognitive personality analysis component, a score representing a likelihood that a chat message associated with the determined tone category will start a new conversation.

4. The method of claim 1, further comprising comparing, by the new conversation prediction engine, the conversation separation score to a predetermined threshold.

5. The method of claim 1, wherein the multi-user messaging platform color codes separate conversations in the communication channel in response to receiving the conversation separation recommendation.

6. A computer program product comprising a computer readable storage medium having a computer readable program stored therein, wherein the computer readable program, when executed on at least one processor of a data processing system, causes the data processing system to implement a chat topic identification system for identifying chat topics in a multi-user messaging platform, wherein the computer readable program causes the data processing system to:

receive, by the chat topic identification system, a plurality of chat messages submitted to a communication channel in the multi-user messaging platform;

perform, by a cognitive content language analysis component executing within the chat topic identification system, cognitive content language analysis on at least one given chat message of the plurality of chat messages by a given user to determine relevance among words, to identify separate topic indicator words, and to build topic domains likely to be relevant to participants of the communication channel, wherein the cognitive language analysis component uses a natural language classifier trained with historical data to determine keywords or phrases that trigger new conversation threads, wherein each keyword or phrase has an associated first score representing a likelihood the keyword or the phrase will lead to a new conversation thread being started;

perform, by a cognitive personality analysis component executing within the chat topic identification system, cognitive personality analysis on the at least one given chat message to determine a personality type for a given participant associated with the at least one given chat message;

perform, by a cognitive tone analysis component executing within the chat topic identification system, cognitive tone analysis on the at least one given chat message to determine a tone category for the given participant associated with the at least one given chat message;

perform, by a social data analysis component executing within the chat topic identification system, social data analysis on other messages on at least one social network to enhance a user profile associated with the given participant;

store, by the chat topic identification system, results of the cognitive content language analysis, the cognitive personality analysis, the cognitive tone analysis, and the social data analysis in the user profile associated with the user to form an updated user profile;

determining, by a new conversation prediction engine executing within the chat topic identification system, a conversation separation score representing a likelihood that a new conversation is being started in the communication channel, wherein the conversation separation score is generated based on analysis of the updated user profile containing previous cognitive analysis results from the cognitive content language analysis, the cognitive personality analysis, the cognitive tone analysis, and the social data analysis;

generate, by a new conversation separation recommendation engine executing within the chat topic identification system, a conversation separation recommendation based on the conversation separation score and results of the cognitive content language analysis, the cognitive personality analysis, the cognitive tone analysis, the social data analysis, and conversation feature analysis, wherein the conversation separation recommendation identifies a plurality of engaged participants within the communication channel and relevant messages within the plurality of chat messages;

send, by the chat topic identification system, the conversation separation recommendation to the multi-user messaging platform;

create, by the multi-user messaging platform, a new communication channel for the new conversation thread; and prepopulate the new communication channel with the plurality of engaged participants and the relevant messages.

7. The computer program product of claim 6, wherein the computer readable program further causes the data processing system to determine, by the cognitive personality analysis component, a score representing a likelihood that the given participant of the determined personality type will start a new conversation.

8. The computer program product of claim 6, wherein the computer readable program further causes the data processing system to determine, by the cognitive personality analysis component, a score representing a likelihood that a chat message associated with the determined tone category will start a new conversation.

9. The computer program product of claim 6, wherein the computer readable program further causes the data processing system to compare, by the new conversation prediction engine, the conversation separation score to a predetermined threshold.

10. The computer program product of claim 6, wherein the multi-user messaging platform color codes separate conversations in the communication channel in response to receiving the conversation separation recommendation.

11. An apparatus comprising:
a processor; and
a memory coupled to the processor, wherein the memory comprises instructions which, when executed by the processor, cause the processor to implement a chat topic identification system for identifying chat topics in a multi-user messaging platform, wherein the instructions cause the processor to:
receive, by the chat topic identification system, a plurality of chat messages submitted to a communication channel in the multi-user messaging platform;
perform, by a cognitive content language analysis component executing within the chat topic identification system, cognitive content language analysis on at least one given chat message of the plurality of chat messages by a given user to determine relevance among words, to identify separate topic indicator words, and to build topic domains likely to be relevant to participants of the communication channel, wherein the cognitive language analysis component uses a natural language classifier trained with historical data to determine keywords or phrases that trigger new conversation threads, wherein each keyword or phrase has an associated first score representing a likelihood the keyword or the phrase will lead to a new conversation thread being started;
perform, by a cognitive personality analysis component executing within the chat topic identification system, cognitive personality analysis on the at least one given chat message to determine a personality type for a given participant associated with the at least one given chat message;
perform, by a cognitive tone analysis component executing within the chat topic identification system, cognitive tone analysis on the at least one given chat message to determine a tone category for the given participant associated with the at least one given chat message;
perform, by a social data analysis component executing within the chat topic identification system, social data analysis on other messages on at least one social network to enhance a user profile associated with the given participant;
store, by the chat topic identification system, results of the cognitive content language analysis, the cognitive personality analysis, the cognitive tone analysis, and the social data analysis in the user profile associated with the user to form an updated user profile;
determine, by a new conversation prediction engine executing within the chat topic identification system, a conversation separation score representing a likelihood that a new conversation is being started in the communication channel, wherein the conversation separation score is generated based on analysis of the updated user profile containing previous cognitive analysis results from the cognitive content language analysis, the cognitive personality analysis, the cognitive tone analysis, and the social data analysis;
generate, by a new conversation separation recommendation engine executing within the chat topic identification system, a conversation separation recommendation based on the conversation separation score and results of the cognitive content language analysis, the cognitive personality analysis, the cognitive tone analysis, the social data analysis, and conversation feature analysis, wherein the conversation separation recommendation identifies a plurality of engaged participants within the communication channel and relevant messages within the plurality of chat messages;
send, by the chat topic identification system, the conversation separation recommendation to the multi-user messaging platform;
create, by the multi-user messaging platform, a new communication channel for the new conversation thread; and
prepopulate the new communication channel with the plurality of engaged participants and the relevant messages.

12. The apparatus of claim 11, wherein the instructions further cause the processor to compare, by the new conversation prediction engine, the conversation separation score to a predetermined threshold.

13. The apparatus of claim 11, wherein the instructions further cause the processor to determine, by the cognitive personality analysis component, a score representing a likelihood that the given participant of the determined personality type will start a new conversation.

14. The apparatus of claim 11, wherein the instructions further cause the processor to determine, by the cognitive personality analysis component, a score representing a likelihood that a chat message associated with the determined tone category will start a new conversation.

15. The apparatus of claim 11 wherein the multi-user messaging platform color codes separate conversations in the communication channel in response to receiving the conversation separation recommendation.

* * * * *